May 1, 1945.  A. M. BIEHL  2,374,972
REFRIGERATING SYSTEM FOR MOBILE VEHICLES
Filed May 18, 1944
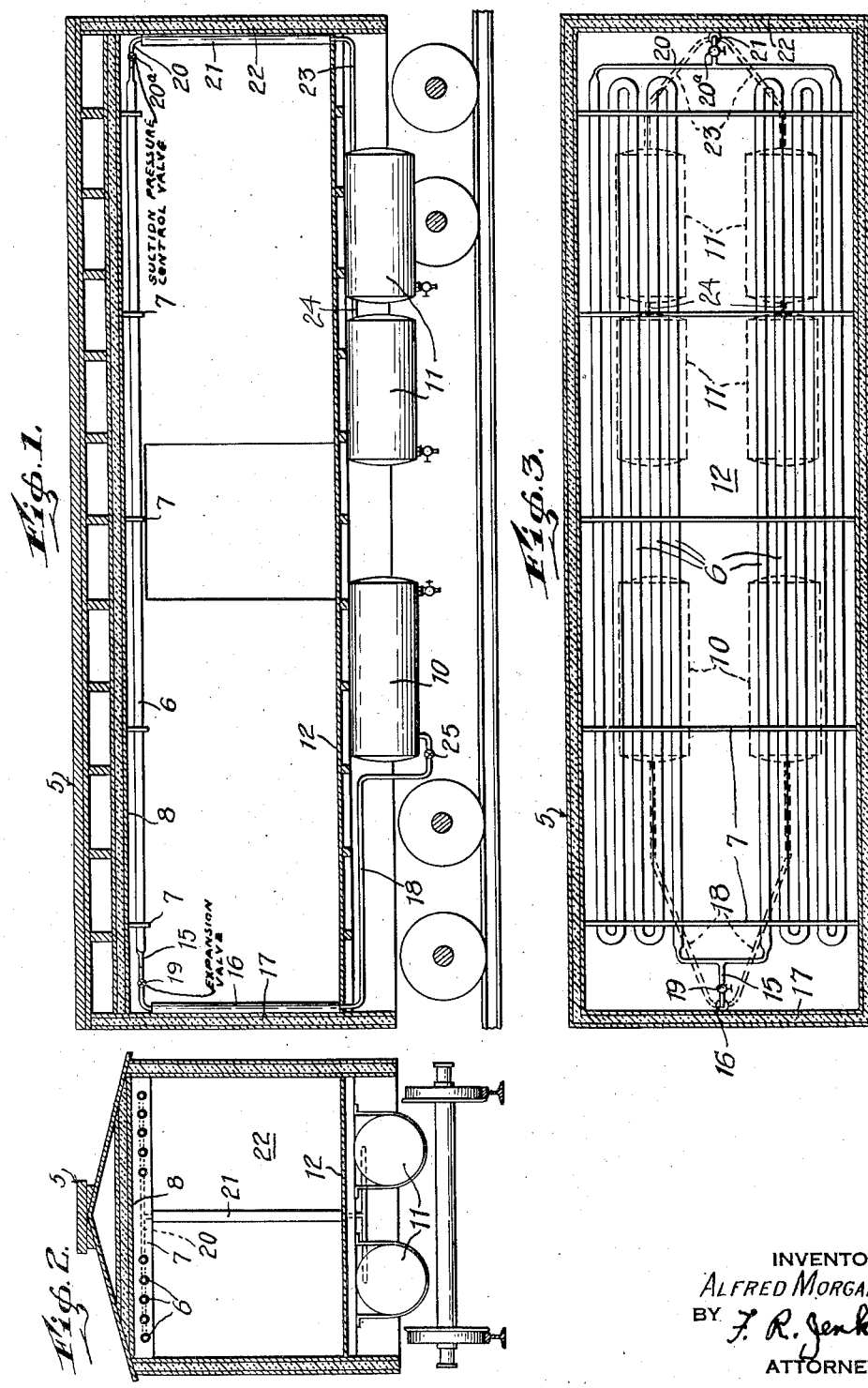
INVENTOR
ALFRED MORGAN BIEHL
BY F. R. Jenkins
ATTORNEY Patented May 1, 1945

2,374,972

UNITED STATES PATENT OFFICE 2,374,972

REFRIGERATING SYSTEM FOR MOBILE VEHICLES

Alfred Morgan Biehl, New York, N. Y., assignor to Railway Refrigeration Corporation, New York, N. Y., a corporation of New York Application May 18, 1944, Serial No. 536,098

2 Claims. (Cl. 62—5)

This invention relates to means and methods of refrigeration and more particularly to systems or apparatus and methods for refrigerating railway cars or other mobile closed vehicles, though it is noted that in some of the claims the invention is not limited to vehicles.

Objects of the invention are to provide an improved device or apparatus of this kind which can cool cars and other moving vehicles as satisfactorily as those obtained in well designed storage rooms, and which can be thermostatically or manually controlled, which has no moving parts, and in which heavy parts are below the vehicle floor.

Other objects of the invention are to provide an improved device of this kind which can be applied to any mobile vehicle and which can be serviced from suitable servicing stations to which the vehicle may be brought.

Another object is to provide a convenient reservicing method, and a method which avoids waste of energy when not actually refrigerating.

Additional objects of the invention are to effect simplicity and efficiency in such methods and apparatus and to provide an extremely simple apparatus of this kind which is economical and reliable in operation, and economical to manufacture and install.

Still other objects of the invention will appear as the description proceeds; and while herein details of the invention are described in the specification and some of the claims, the invention as described in the broader claims is not limited to these, and many and various changes may be made without departing from the scope of the invention as claimed in the broader claims.

While the apparatus may be used with any kind of vehicle or enclosure, the inventive features for the accomplishment of these and other objects are shown herein, by way of example, in connection with an absorption system for use with a railway refrigerator car, which system, briefly stated includes vaporizing expansion cooling coils disposed along the ceiling of the car, and groups of valved ammonia pressure tanks and absorption tanks mounted underneath the floor of the car, armored conduit means connecting opposite ends of the coils to the pressure tanks and the absorption tanks respectively, the main pressure conduit being provided with a regulating expansion valve adjacent to the coils.

In the accompanying drawing showing, by way of example, one of the many possible embodiments of the invention, Fig. 1 is a diagrammatic side elevation, partly in section of a refrigerator car with the front side wall removed, equipped with my refrigerating or cooling system;

Fig. 2 is a diagrammatic end view of the car and apparatus, the coils being shown in section, the end wall of the car being removed;

Fig. 3 is a diagrammatic plan of the car with top and some other parts removed, and showing the locations of parts of the apparatus.

The drawing shows the apparatus applied to a typical railway refrigerator car 5, though it may be applied to any other closed mobile vehicle. As shown the suitably finned vaporizing expansion cooling coils 6 are held by brackets 7 along and spaced just under the ceiling 8 of the car substantially from end to end.

Groups of valved storage tanks 10 for anhydrous ammonia and absorption tanks 11 for water or aqua ammonia are mounted low beneath the floor 12 of the car.

A main high pressure conduit or pipe 15 and connected branch conduits or pipes 18 under the car floor 12 and flexible hose or conduit 16 at the end wall 17 lead to the cooling coils from the bottom of pressure tanks 10, the main pipe being provided with a regulating expansion valve 19 adjacent to the coils, which may be thermostatically, manually and/or otherwise suitably controlled in the well known manner.

A low pressure conduit or pipes 20 and flexible hose or conduit 21 at the end wall 22 and connected branch conduits or pipes 23 and connecting pipes 24 under the floor lead from the opposite end of the cooling coils 6 to the absorption tanks 11. One or more or all of the conduits are suitably armored.

The tanks 10 and 11 are placed low beneath the floor to avoid tendency to tilt the car during motion, especially when going around curves. Thus 90% of the total weight is carried at a low center of gravity.

In operation, the liquid anhydrous ammonia ($NH_3$) passes from the high pressure tank or tanks 10 through the conduits 18, 16, 15 to the upper part of the car through the expansion valve 19, to allow the ammonia to evaporate in the closed space in the coils 6 having large radiating surfaces, thereby to cool the air in the car. The vaporized ammonia is then conducted through the conduits 20, 21, 23, 24 to the absorption tanks 11 to be absorbed by the water or aqua therein, after which the strong aqua is removed from the absorption tanks to allow the ammonia to be recovered for use again in the pressure tanks.

Between the tanks 11 and the coils 6, preferably near the coils in the pipe 20, is a suction pressure control valve 20a which controls the pressure at which the liquid ammonia expands into ammonia gas, thus determining, by the selective setting of the valve 20a, the temperature of the expanded liquid ammonia in the coils 6. This valve 20a on a 35° F. car (for fresh products) would be set at a pressure of say 30# ga. and set the evaporating temperature at +16.6° F. On a 10° F. freezer car (for frozen foods), the valve 20a would be set at say 10# ga. and set the evaporating temperature at −8.4° F.

In servicing, the tanks 10 are first charged, about 85% full, with liquid ammonia which is not precooled and the tanks 11 are filled about 50% full with weak aqua or water from a servicing station alongside the railway and/or highway. When the ammonia has fully performed its functions, the car is run alongside a redistillation service plant where the spent ammonia now absorbed into the aqua of the tanks 11, forming strong aqua, is drawn from the tanks 11 into the servicing plant where the ammonia is redistilled from the aqua. Then the liquid ammonia and remaining weak aqua are placed in separate storage tanks, at the service plant, ready to charge the tanks 10 and 11 of succeeding cars or trucks requiring it.

The drawing shows a typical refrigerator railway car which, when equipped as indicated, can be thermostatically controlled at, say 35° F. for 72 hours with the initial charge of 1,157 lbs. of anhydrous ammonia ($NH_3$). This can be done economically with refrigerating results equally satisfactory to those obtained from well designed cold storage rooms. Since there are no moving parts to break down or get out of order the operation will be equally as reliable as that of the cold storage rooms. The tanks 11 are designed to hold on starting an initial half-full load of weak aqua ammonia or water and to act as absorbers. The tanks 10 may be designed to hold a load of 1,157 lbs. of $NH_3$ at 85% full. The number and dimensions of tanks as well as the quantities of ammonia may be changed to suit the requirements as to the size of car or truck.

This invention may be applied to any mobile vehicle, whether self-propelled or not, which vehicle should be provided with adequate insulation.

The system will provide means for avoiding spoilage of perishables in transit. It will reduce cost of refrigeration and bring about other economies, to the car and truck owners as well as to the shippers, because the ammonia is regenerated with very little loss and used over and over again, hence the resulting economy.

The car or other vehicle is equipped as described. When refrigeration is wanted either a manual or a thermostatic control valve 19 is turned on, thus starting the ammonia to pass from tank 10 up through the pipes 18, 16, 15 to the coils 6, the rate being regulated by automatic thermostat or hand control valve 19. As the ammonia is spent in the coils, it passes from the coils 6 through the pipe 20, flexible hose 21 and pipes 23, 24 and is absorbed into the aqua or water in the tanks.

When refrigeration is not required the hand valve 25 adjacent to the tank 10 is closed, there being no loss of energy so long as this valve is closed.

The invention claimed is:

1. In combination, a refrigerator car; vaporizing expansion cooling coils disposed along the ceiling of the car substantially from end to end; groups of valved storage pressure tanks and absorption tanks mounted underneath the floor of the car; a main high pressure pipe and connected branch conduits leading under the car floor and at the end wall to the cooling coils from the pressure tanks, the main high pressure pipe being provided with a regulating expansion valve adjacent to the coils; and a low pressure main pipe in the car, and connected branch conduits leading at the end wall and under the floor from the opposite end of the cooling coils to the absorption tank, the low pressure main pipe being provided with a suction pressure control valve for controlling the pressure at which the liquid ammonia expands in the coils.

2. In combination, a mobile vehicle having a storage space therein, a vaporizing expansion cooling coil disposed within the vehicle and adapted to cool contents in said space; a storage pressure tank and an absorption tank mounted on the vehicle exterior of the space and below the floor of said vehicle; conduit means connecting one end of the cooling coil to the pressure tank and provided with a thermostatically controlled regulating expansion valve between the coil and pressure tank; conduit means connecting the other end of the cooling coil to the absorption tank; and a suction pressure control valve in the last mentioned conduit means and intermediate of the coil and absorption tank for maintaining substantially constant pressure in the cooling coil.

ALFRED MORGAN BIEHL.